Oct. 13, 1931.                 C. G. BIDWELL                 1,827,415
                                  CHUCK
                            Filed Oct. 12, 1929
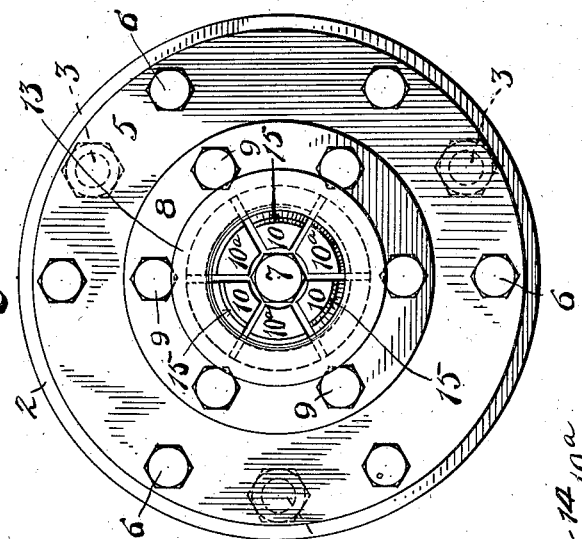
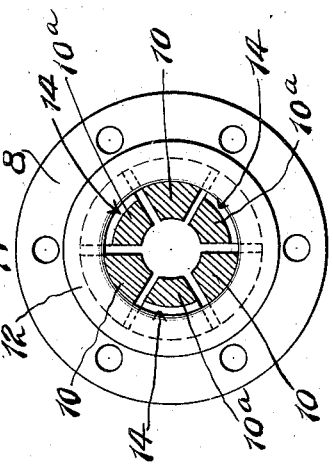
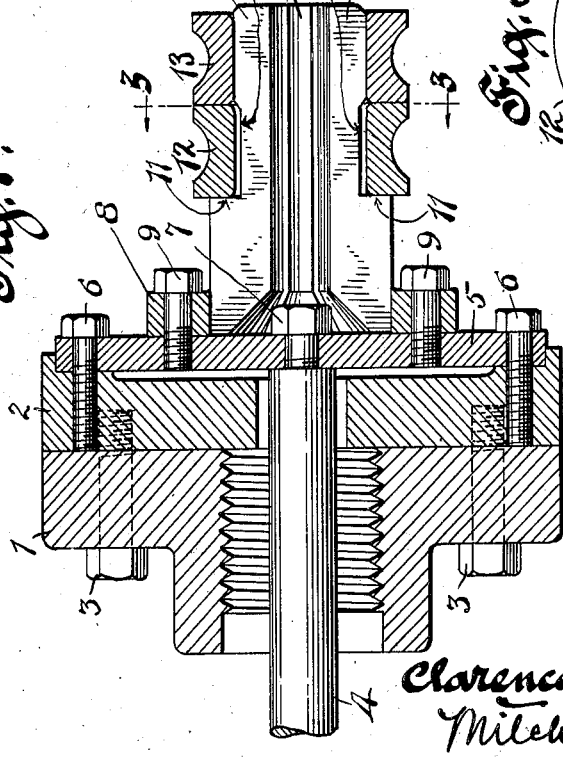
INVENTOR
Clarence G. Bidwell
BY
Mitchell Bechert
ATTORNEYS Patented Oct. 13, 1931

1,827,415

UNITED STATES PATENT OFFICE

CLARENCE G. BIDWELL, OF BRISTOL, CONNECTICUT, ASSIGNOR TO THE FAFNIR BEARING COMPANY, OF NEW BRITAIN, CONNECTICUT, A CORPORATION OF CONNECTICUT

CHUCK

Application filed October 12, 1929. Serial No. 399,134.

This invention relates to a diaphragm chuck.

One of the main objects of the invention is to provide a chuck for holding a plurality of work pieces accurately in a predetermined position for such operations, for example, as grinding.

Another object is to provide a construction whereby a plurality of work pieces may be successfully mounted on a single chuck for such operations, thereby expediting production.

Briefly stated, the preferred form of the invention embodies a diaphragm having a plurality of gripping jaws thereon offset from the face thereof so that upon the flexing of the diaphragm the jaws may be moved transversely. The diaphragm is preferably flexed out of its normal position by means located centrally relatively thereto so that when said diaphragm is flexed in one direction, the jaws will move outwardly and when flexed in the opposite direction, the jaws will move inwardly.

In the drawings, I have shown one form of the invention, this form being of the type adapted to receive and hold at least two work pieces on the outer sides of the jaws, the same identical principle, however, being equally available for gripping work pieces between or inside of the jaws, that being a mere reversal of the particular form I have shown and will describe.

In the drawings—

Fig. 1 is a longitudinal section of my improved diaphragm chuck indicating two work pieces gripped by said diaphragm and in position for operations thereon;

Fig. 2 is an end elevation of the part shown in Fig. 1 looking from right to left;

Fig. 3 is a cross-section on the plane of the line 3—3 of Fig. 1, the diaphragm being omitted.

1 represents the body or base of the chuck. 2 is a face-plate mounted thereon and firmly connected thereto as by any suitable means such as by screws 3. The body 1 and the face-plate 2 each have a central passage for a plunger 4. Mounted on the face-plate 2 is a diaphragm 5, the same being secured thereto in any desirable way as by screws 6—6. The plunger 4 is suitably connected with the diaphragm. In the present instance, this connection is effected by means of a screw 7 which passes through a central aperture in the diaphragm and screws into the end of the plunger 4. The diaphragm is provided with gripping jaws, in the present disclosure shown as being formed separate from the diaphragm. Clearly, such jaws could be made integral with the diaphragm. 8 is the base ring of what I will term the jaw body. This jaw body is secured to the central part of the diaphragm by screws 9—9. The central part of the body projects outwardly to form jaws (in this instance six in number), comprising two concentric sets, one set of jaws being indicated by the numerals 10—10—10, the other set being indicated by the numerals 10ª— 10ª—10ª. Each of the jaws is preferably provided with a positioning shoulder 11 against which one work piece rests when in operative position. 12—13 indicate two work pieces. In this instance, the work pieces may be assumed to be ball bearing rings upon each of which a grinding operation is to be performed. In this instance, also, the grinding operation is to be performed on the outside of each ring for the purpose of providing a finished ball race groove in each of them. In order to support and grip two bearing rings or work pieces upon the jaws of the chuck and to have each of the same properly gripped, I so construct these jaws that one set, for example the set indicated by the numerals 10—10—10, will engage one work piece, for example the work piece 12, while the other set indicated by the numerals 10ª—10ª—10ª will engage the second work piece 13. This I accomplish by cutting down slightly the alternate jaws of each set underneath or back of the position for the respective work pieces or rings. For example, the jaws 10ª, which are to grip the ring 13, are cut down at 14 back of the position for the ring 12 so that the presence of the ring 12 on its set of jaws will not interfere with the gripping movement of the jaws for said ring 13. The set of jaws 10, which are to grip the ring 12, are cut down at 15 back of the position for the ring 13 so that when the latter is on its set of jaws it will not interfere with the movement of the jaws 10 for said ring 12. By arranging both sets of jaws concentrically and in line, a plurality of work pieces may be quickly applied to, and gripped by, the chuck.

The operation of that particular form of device shown in Fig. 3 is as follows:

When the chuck is empty and it is desired to place thereon the work pieces, the plunger 4 is positively moved, buckling the diaphragm to the left as viewed in Fig. 1, which causes the jaws to approach each other so that the rings 12—13 may be slipped thereon, the stop shoulder 11 serving to position the ring 12, the ring 12 in turn serving to position the ring 13. When these rings are thus positioned, the plunger 4 is moved so that the diaphragm may return toward its normal position, which tends to move the jaws in the direction to positively grip each of the work pieces 12—13 with such firmness that they will not be shifted by the action of a tool such as a grinding wheel on the face of the rings. By providing a chuck construction of this very simple character, a plurality of work pieces may be handled in one operation and the productive capacity of a single machine correspondingly increased.

I claim:

1. In a chuck of the character described, a head, a flexible diaphragm, a plurality of sets of concentric chuck jaws mounted thereon at their inner ends only for engaging a plurality of work pieces thereon.

2. In a chuck of the character described, a head, a flexible diaphragm, a plurality of sets of concentric chuck jaws mounted thereon at their inner ends only for separately engaging a plurality of work pieces thereon.

3. In a chuck of the character described, a head, a flexible diaphragm, a plurality of sets of concentric chuck jaws mounted thereon at their inner ends only for engaging a plurality of work pieces thereon, the jaws of one set being located between the jaws of the other set.

4. In a chuck of the character described, a head, a flexible diaphragm, a plurality of sets of concentric chuck jaws mounted thereon at their inner ends only for separately engaging a plurality of work pieces thereon, the jaws of one set being located between the jaws of the other set.

5. In a chuck of the character described, a head, a flexible diaphragm, a plurality of sets of concentric chuck jaws mounted thereon at their inner ends only for engaging a plurality of work pieces thereon, and means to flex said diaphragm.

6. In a chuck of the character described, a head, a flexible diaphragm, a plurality of sets of concentric chuck jaws mounted thereon for engaging a plurality of work pieces thereon, the jaws of one set being located between the jaws of the other set, the jaws of one set being cut away to act freely of one work piece, the jaws of another set being cut away to act freely of another work piece.

7. In a chuck of the character described, a head, a flexible diaphragm, a plurality of sets of concentric chuck jaws mounted thereon at their inner ends only for engaging a plurality of work pieces thereon end to end.

8. In a chuck of the character described, a head, a flexible diaphragm, a plurality of sets of concentric chuck jaws mounted thereon at their inner ends only for engaging a plurality of work pieces thereon, and a positioning shoulder for one of said work pieces.

9. In a chuck of the character described, a head, a flexible diaphragm, a plurality of sets of concentric chuck jaws mounted thereon at their inner ends only for engaging a plurality of work pieces thereon end to end, and a positioning means for the end of one of said work pieces.

CLARENCE G. BIDWELL.